United States Patent [19]

Cox

[11] 4,334,502
[45] Jun. 15, 1982

[54] LIVESTOCK FEEDER APPARATUS

[76] Inventor: Richard D. Cox, P.O. Box 387, Carrollton, Mo. 64633

[21] Appl. No.: 784,027

[22] Filed: Apr. 4, 1977

[51] Int. Cl.³ .............................................. A01K 5/00
[52] U.S. Cl. ...................................................... 119/53
[58] Field of Search ....................... 119/53, 53.5, 52 R, 119/20

[56] References Cited

U.S. PATENT DOCUMENTS

| 791,171 | 5/1905 | Washburn | 119/53 |
|---|---|---|---|
| 2,863,419 | 12/1958 | Murrell | 119/52 R X |
| 3,565,044 | 2/1971 | Sorrels | 119/53 |
| 3,921,585 | 11/1975 | Hall | 119/20 |

Primary Examiner—Hugh R. Chamblee
Attorney, Agent, or Firm—C. Clark Dougherty, Jr.

[57] ABSTRACT

An improved feeder apparatus for livestock which includes an enclosure for containing feed, at least one feeding trough positioned adjacent the enclosure and at least one slidable side door disposed over an opening in the enclosure for unloading feed into the trough. A pair of bars are attached to the enclosure adjacent the outwardly facing side of the slidable side door. The bars are positioned in close proximity to each other so that an elongated slot is formed therebetween parallel to the direction of slide of the door. The door includes an outwardly projecting threaded post which extends through the slot and a wing nut is threadedly connected to the post so that the wing nut can be tightened against the bars to lock the door in a selected position.

1 Claim, 7 Drawing Figures

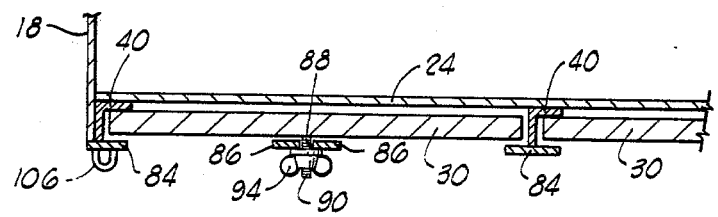
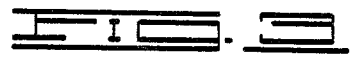
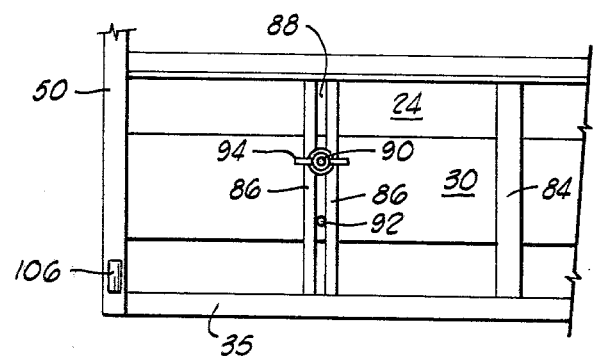
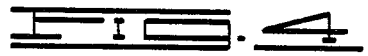
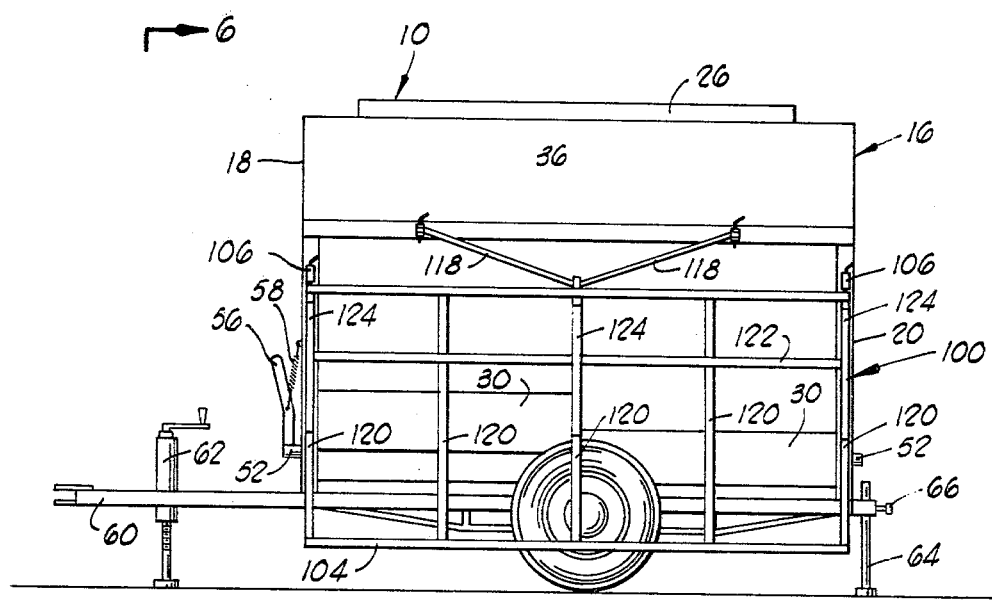
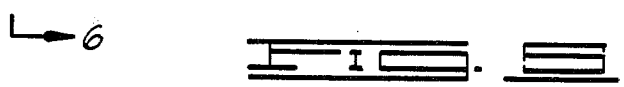

LIVESTOCK FEEDER APPARATUS

BACKGROUND OF THE INVENTION

1. Field of the Invention

The present invention relates generally to an improved livestock feeder apparatus, and more particularly, but not by way of limitation, to a livestock feeder apparatus which includes an enclosure for containing feed, at least one feed trough positioned adjacent the enclosure and at least one slidable door disposed over an opening in the enclosure for unloading feed from the enclosure into the trough by gravity.

2. Description of the Prior Art

Many various types of livestock feeding apparatus have been developed. Recently, portable livestock feeding apparatus which can be attached to a pick-up truck or tractor for transport to a pasture where livestock are confined have come into use. Such feeders commonly include a feed container mounted on a portable chassis with one or more feed troughs attached thereto. A top-loading door is usually provided through which the container is filled, and one or more slidable side doors are provided positioned over openings in the enclosure adjacent the feed trough through which the feed is caused to flow by gravity.

While a variety of locking devices have heretofore been provided on such portable livestock feeding apparatus so that the slidable side doors can be locked in a desired position between fully opened and fully closed whereby a desired quantity and rate of feed flows into the feed troughs from the enclosure, problems in the operation of such locking devices have been encountered. That is, most of such locking devices are rendered relatively ineffective due to clogging of the devices by feed and/or jamming of the doors in a partially open or closed position. In addition, most of such prior locking devices require the use of a tool such as a wrench for operating them.

By the present invention an improved livestock feeding apparatus is provided which includes means for locking the slidable side doors in a desired position which remains free of feed clogs, prevents jamming and does not require the use of a wrench or other tool. In another aspect of the present invention, removable pens are provided for limiting the size of livestock having access to the feed troughs.

SUMMARY OF THE INVENTION

The present invention relates to an improved feeder apparatus for livestock which includes an enclosure for containing feed, at least one feed trough positioned adjacent the enclosure and at least one slidable side door disposed over an opening in the enclosure for unloading feed from the enclosure into the feed trough. A pair of bars are attached to the enclosure adjacent the outwardly facing side of the slidable side door positioned parallel to the direction of slide of the door and in close proximity to each other so that an elongated slot is formed therebetween. An outwardly projecting threaded post is attached to the outwardly facing side of the door positioned to extend through the slot, and a wing nut is threadedly connected to the threaded post whereby the wing nut can be tightened on the post against the bars thereby locking the door in selected position. In another aspect of this invention, a pen is removably attached to the enclosure around the feed trough which includes one or more openings therein for admitting livestock of selected size therethrough.

It is, therefore, a general object of the present invention to provide an improved feeder apparatus for livestock.

Another object of the present invention is the provision of a livestock feeder apparatus which includes slidable side unloading doors and means for locking said doors in a desired position which are hand operable and which will not become inoperative due to clogging or jamming.

Yet a further object of the present invention is the provision of an improved livestock feeder apparatus which includes one or more pens attached thereto for limiting access to the feed troughs to livestock of a selected size, which pens are readily removed from the apparatus and transported therewith.

Other objects and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a partial enlarged top sectional view of the slidable side unloading doors on one side of the apparatus of FIG. 1.

FIG. 4 is a partial elevational view of the doors of FIG. 3.

FIG. 5 is a side elevational view of the apparatus of FIG. 1 having removable limited access pens attached thereto.

DESCRIPTION OF PREFERRED EMBODIMENTS

Figure 1:
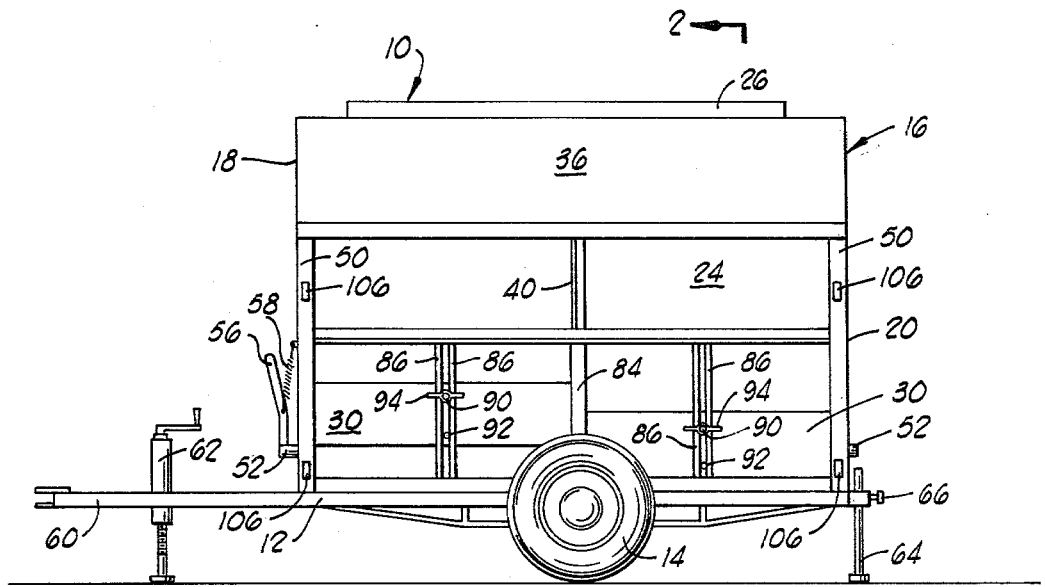
FIG. 1 is a side elevational view of a portable livestock feeder which includes the improvement of the present invention.
Figure 2:
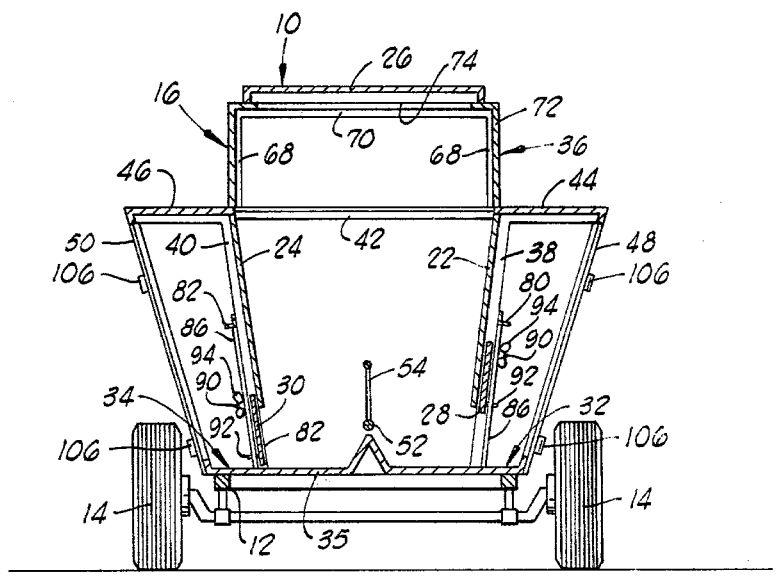
FIG. 2 is a cross-sectional view taken along line 2—2 of FIG. 1.

Referring now to the drawings, and particularly to FIGS. 1 and 2, a portable livestock feeder apparatus including the improvement of the present invention is illustrated and generally designated by the numeral 10. The feeder 10 includes a chassis 12 having a feed enclosure 16 and wheels 14 mounted thereon. The enclosure 16 is comprised of a forward wall 18, a rearward wall 20, side walls 22 and 24, a bottom wall 35 and a top wall assembly 36. The top wall assembly 36 includes a hinged top-loading door 26 through which the enclosure 16 is filled with feed. A pair of slidable feed unloading doors 28 are disposed on the side 22 of the enclosure 16 over openings therein, and the side 24 of the enclosure 16 includes a pair of slidable doors 30 disposed over openings therein. As is best shown in FIG. 2, a pair of feed troughs 32 and 34 extend outwardly from the sides 22 and 24 of the enclosure 16 respectively for receiving feed from the enclosure 16 by way of the side unloading doors 28 and 30.

The top assembly 36 of the enclosure 16 is supported above the bottom 35 thereof by angle support members 38 which are attached to the side wall 22 and angle support members 40 attached to the side wall 24. The lower ends of the support members 38 and 40 are attached to the bottom 35 at a point inward from the side edges of the bottom 35 thereby forming the troughs 32 and 34. The upper ends of the angle support members 38 and 40 are attached to angle support members 42 which are positioned parallel to the bottom 35. The horizontal angle support members 42 extend outwardly a distance past the angle support members 38 and 40 and sheet metal coverings 44 and 46 are attached thereto to provide weather shields for the feed troughs 32 and 34 respectively. Angle support members 48 and 50 are provided connected between the ends of the horizontal angle support members 42 and the bottom 35 at opposite ends of the enclosure 16.

A shaft 52 having a plurality of arms or fingers 54 attached thereto is diposed within the container 16 positioned parallel to the bottom 35 thereof. The ends of the shaft 52 are journaled in the forward and rearward ends 18 and 20 of the enclosure 16, and a handle 56 is attached to the forward end of the shaft 52 outside the enclosure 16. A resilient spring member 58 is provided attached to the handle 56 at one end and to the forward end 18 of the enclosure 16 at its other end. The spring member 58 serves to maintain the handle 56 and the arms 54 in an upright position. As will be understood, when the handle 56 is moved, the shaft 52 and arms 54 within the enclosure 16 are also moved thereby agitating the feed contained within the enclosure 16.

Referring now particularly to FIG. 1, the chassis 12 of the portable livestock feeder 10 includes a tongue 60 at its forward end which can be attached to a pick-up truck or tractor for transporting the feeder 10 from place to place. A conventional leveler or jack 62 is attached to the tongue 60 and an adjustable foot member 64 is attached to the chassis 12 at its rearward end. The foot member 64 includes a locking screw 66 for locking it in a desired position.

The top assembly 36 of the enclosure 16 comprises a plurality of vertical angle support members 68 attached to the angle support members 42 at their lower ends and to a plurality of horizontal angle support members 70 at their upper ends. A sheet metal covering 72 is attached to the angle support members 68 and 70 and an opening 74 is provided therein which is covered by the top-loading door 26.

As best shown in FIG. 2, the side walls 22 and 24 of the enclosure 16 terminate short of the bottom 35 leaving openings between the walls 22 and 24 and the bottom 35. The doors 28 and 30 are positioned over the openings between two of the angle support members 38 and/or 40 previously described and are slidable whereby they can be moved to open or close the openings. As best shown in FIG. 3, the doors 28 and 30 are maintained between the angle support members 38 and 40 by vertically positioned flat bars 84 attached to the angle support members 38 and 40.

A pair of horizontally positioned angle support members 80 and 82 are attached to the vertical angle support members 38 and 40 respectively at positions above the doors 28 and 30. A pair of vertically positioned flat bars 86 are attached between the horizontal angle support members 80 and 82 and the bottom 35 of the enclosure 16 adjacent each of the doors 28 and 30. As best shown in FIGS. 3 and 4, the bars 86 are positioned in close proximity to each other so that an elongated slot 88 is formed between the bars 86 parallel to the direction of slide of the doors. Each of the doors 28 and 30 includes an outwardly projecting threaded post 90 attached to the outwardly facing side thereof positioned to extend through the slot 88. Preferably, in addition to the threaded post 90, a second threaded post 92 is provided attached to each of the doors 28 and 30. The second post is spaced apart from the first post 90 and is also positioned to extend through the slot 88. As will be understood, when two posts 90 and 92 are utilized, their engagement within the slot 88 tends to maintain the doors 28 and 30 in a horizontal position which prevents the doors 28 and 30 from jamming. Each of the threaded posts 90 includes a wing nut 94 threadedly connected thereto. As will now be apparent, the doors 28 and 30 are locked in a desired position by tightening the wing nuts 94 on the posts 90 against the bars 88. Wing nuts can also be threadedly connected to the posts 92, or, alternatively, only one wing nut 94 can be utilized so that if the threads on the post 90 are rendered inoperable, the wing nut 94 can be threadedly connected to the threaded post 92.

In operation, the portable livestock feeder 10 is filled with feed through the top loading door 26 with the slidable side doors 28 and 30 in the closed position. The feeder is then transported to a location for feeding livestock and the doors 28 and 30 are opened to a desired position so that the desired quantity of feed flows by gravity into the feed troughs 30 and 32 respectively. As will be understood, it may be desirable to open only one of the doors 28 or 30 or all of the doors 28 and 30, depending upon the number of livestock to be fed.

If the feed within the enclosure 16 is compacted and prevented from flowing through the doors 28 and 30, the handle 56 can be moved in either or both directions thereby rotating the shaft 52 and the vertical arm members 54 within the enclosure 16 causing the feed to be agitated.

The doors 28 and 30 are locked in the desired position by tightening the wing nuts 94 on the threaded posts 90 against the bars 86. When it is desired to unlock the doors 28 and 30, the wing nuts 94 are simply loosened on the posts 90 and the doors moved to a desired different position.

Figure 6:
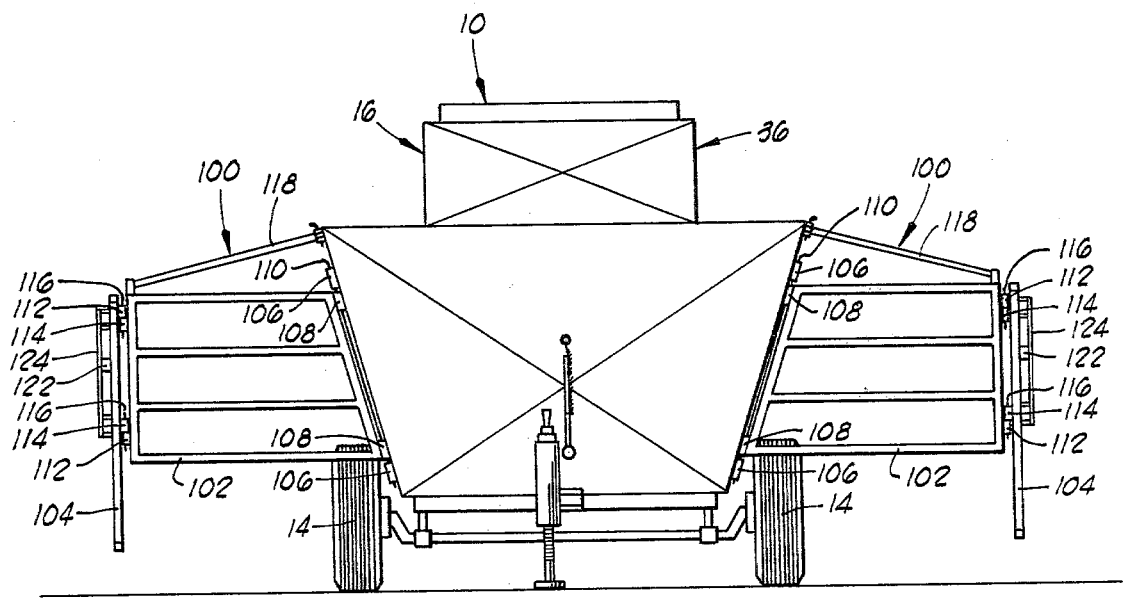
FIG. 6 is a front view of the apparatus of FIG. 5 taken along line 6—6 thereof.

Referring now to FIGS. 5 and 6, the livestock feeder 10 is illustrated with removable limited access pens of the present invention attached thereto. As will be understood by those skilled in the art, it is often desirable when feeding livestock to limit access to the feed to animals of small size only. For example, when feeding cattle, it is often desirable to feed only calves and exclude mature cattle from the feed. By the present invention, pens are provided which can be removably attached to the feeder apparatus 10, and when the apparatus 10 is moved from one feeding location to another, the pens are simply and easily folded up and positioned within the feed troughs 32 and 34 of the apparatus for transport with the apparatus.

A pen, generally designated by the numeral 100 is attached on each side of the feeder 10 over the feed troughs 32 and 34 thereof. Each of the pens 100 are comprised of a pair of vertically positioned side panels 102 hingedly connected to a vertically positioned end panel 104. Each of the side panels 102 is formed of angle structural members and includes means for removably attaching an end thereof to one of the members 48 or 50 of the feeder 10. That is, each of the vertical angle members 48 and 50 of the apparatus 10 includes a pair of lugs 106 welded thereto. The ends of the side panels 102 also include lugs 108 attached thereto positioned to lie adjacent the lugs 106. Pins 110 are inserted through each pair of adjacent lugs 106 and 108 so that the side panels 102 are removably connected to the feeder 10, one on each side of the troughs 32 and 34 thereof. The end panels 104 are attached at their ends to the other ends of the side panels 102. That is, each of the outwardly extending ends of the side panels 102 includes a pair of lugs 112 and each of the ends of the end panel 104 includes complementary lugs 114. Pins 116 are inserted through each pair of adjacent lugs 112 and 114.

In order to provide stability to the pens 100, the ends of a pair of angles 118 are connected at a single central point to each of the end panels 104. The other ends of the angles 118 are connected to the enclosure 18 at spaced apart positions thereon by means of lugs and pins or other suitable connectors.

The side panels 102 include a plurality of horizontal structural members which prevent livestock from reaching the feed troughs of the apparatus 10 by way of the side panels, and the end panels 104 include a plurality of vertical structural members 120 which are spaced from each other to provide openings therein through which livestock can pass. A horizontal structural member or bar 122 is provided connected to each of the end panels 104. The bars 122 extend across the upper portions of the end panels 104 and function to limit the height of the livestock openings between the vertical members 120. As best shown in FIG. 6, racks 124 are attached to the vertical members 120 of the end panels 104 for retaining the bars 122 on the end panels 104 at selected heights. That is, the racks 124 include a plurality of horizontally positioned fingers for supporting the bars 122 at varying heights.

In operation of the apparatus 10 and pens 100, after the feeder 10 has been moved to a location where it is desired to feed claves or other small livestock without feeding larger livestock, the pens 100 are installed on the apparatus 10 as shown in FIGS. 5 and 6. The horizontal bars 122 are then placed on the end panels 104 at desired heights so that the openings formed in the end panels 104 between the vertical members 120 and below the bars 122 are of a size such that only calves or other small livestock can pass through the openings and gain access to the feed troughs.

Figure 7:
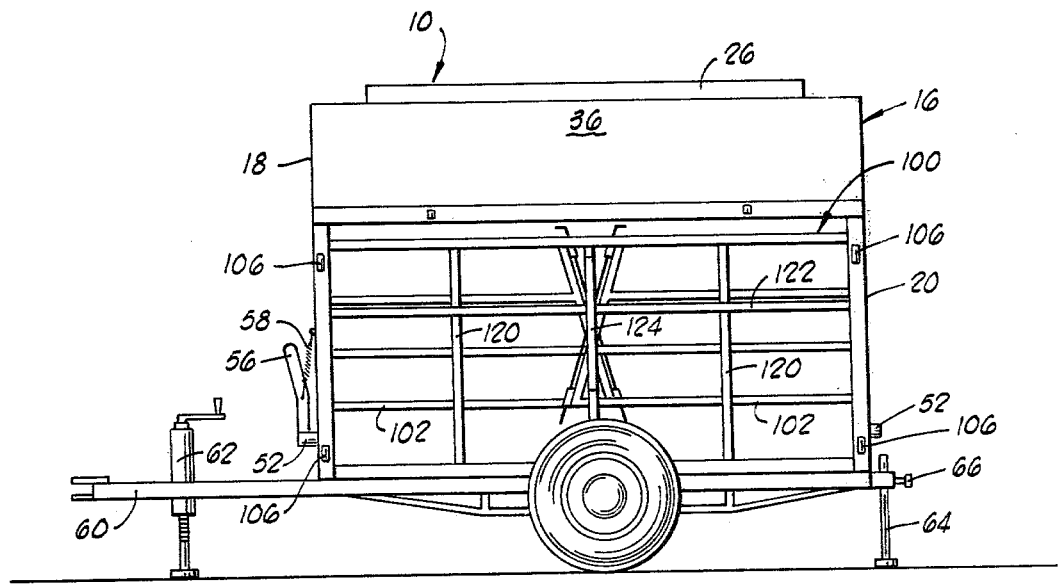
FIG. 7 is a side elevational view of the feeder apparatus of FIGS. 5 and 6 after the limited access pens have been removed therefrom and stored for transport.

If it is desired to move the feeder to a different location over level ground, such movement can take place without removing the pens 100 therefrom. However, if it is desired to move the apparatus 10 over a greater distance or over rough ground, the pens are removed from the apparatus 10 by removing the pins 110 from the lugs 106 and 108 and removing the support members 118. The side panels 102 are then folded inwardly to positions adjacent the end panels 104 and the folded panels are placed within the feed troughs 32 and 34 of the apparatus 10 as shown in FIG. 7. In this manner, the apparatus 10 including the pens 100 can be conveniently transported to a new location whereupon the pens can again be quickly and easily installed on the apparatus 10.

Thus, the present invention is well adapted to carry out the objects and attain the ends and advantages mentioned as well as those inherent therein. While presently preferred embodiments of the invention have been given for the purpose of disclosure, numerous changes in the construction and arrangement of parts will suggest themselves to those skilled in the art, which changes are encompassed within the spirit of this invention as defined by the appended claims.

What is claimed is:

1. In a feeder apparatus for livestock which includes an enclosure for containing feed, at least one feeding trough positioned adjacent said enclosure and at least one slidable side door disposed adjacent at outside surface of said enclosure and over an opening of said enclosure for unloading feed from said enclosure to said trough, the improvement comprising:

said enclosure including a pair of bars attached thereto adjacent the outwardly facing side of said slidable side door, said bars being positioned parallel to the direction of slide of said door and in close proximity to each other so that an elongated slot is formed between said bars;

said door including two vertically spaced apart, outwardly projecting threaded posts attached to said outwardly facing side thereof and positioned to extend through said slot;

two wing nuts, one of said wing nuts threadedly connected to one of said threaded posts and the other of said wing nuts connected to the other of said threaded posts whereby said wing nuts can be tightened on said posts against said bars thereby locking said door in a selected position and maintaining said door in a horizontal position to prevent said door from jamming; and a pen, including:
   a pair of vertically positioned, outwardly extending side panels removably attached to said enclosure, said side panels positioned one on each side of said feed trough;
   a vertical end panel attached to said side panels, said end panel including a plurality of spaced apart vertical bars forming openings therein for admitting livestock therethrough and a horizontal bar positioned across said openings for limiting the height of said openings and said end panel being hinged at its ends to the ends of said side panels whereby upon removal from said enclosure, said side panels can be folded inwardly to positions adjacent said end panel, and further said side and end panels being of a size whereby upon being removed from said enclosure and folded, they can be positioned within said feed trough for transport with said feeder when said feeder is moved;
   means for selectively adjusting the height of said horizontal bar attached to said end panel and to said bar; and
   two support members for stabilizing said pen during both stationary and non-stationary use, said members each having one end thereof removably attached to a different respective one of two spaced apart points of said enclosure and each having the other end thereof removably attached to a single central point of said vertical end panel.

* * * * *